United States Patent [19]

Volkov et al.

[11] 4,238,967
[45] Dec. 16, 1980

[54] DRIVING ARRANGEMENT

[76] Inventors: Dmitry P. Volkov, Kolpachny pereulok, 6, kv. 101, Moscow; Stanislav V. Bondarenko, ulitsa 2 Proletarskaya, 5, kv. 17, Mytischi Moskovskoi oblasti; Alexandr F. Krainev, Izmailovsky prospekt, 91, korpus 3, kv. 56; Evgeny A. Kazakov, ulitsa Polyarnaya, 3, korpus 2, kv. 10, both of Moscow; Sergei A. Surkov, ulitsa Galyanovskaya, 3a, korpus 2, kv. 155, Moscow; Valentin A. Kritsky, ulitsa Kalinina, 98a, Kamyshin Volgogradskoi oblasti; Nikolai N. Schekin, ulitsa Nekrasova, 19, kv. 17, Kamyshin Volgogradskoi oblasti; Vladimir M. Maljuk, 3 mikroraion, 10, kv. 51, Kamyshin Volgogradskoi oblasti; Leonid V. Zaitsev, Flotskaya ulitsa, 7, korpus 5, kv. 750, Moscow; Nikolai K. Grechin, Frunzenskaya naberezhnaya, 42, kv. 26, Moscow; Genrikh L. Bogorodsky, Sirenevy bulvar, 65, korpus 1, kv. 80, Moscow; Gleb K. Dobrinsky, Tenistaya ulitsa, 13a, kv. 52; Gennady P. Koshelenko, ulitsa Posmetnogo, 33, kv. 45, both of Odessa, all of U.S.S.R.

[21] Appl. No.: 872,327

[22] Filed: Jan. 24, 1978

[51] Int. Cl.³ .............................. F16H 57/10
[52] U.S. Cl. ........................... 74/758; 74/785
[58] Field of Search ............... 74/753, 758, 760, 768, 74/785

[56] References Cited

U.S. PATENT DOCUMENTS

| | | | |
|---|---|---|---|
| 1,379,833 | 5/1921 | Newton | 74/758 |
| 2,170,444 | 8/1939 | Barbarou | 74/768 |
| 2,517,875 | 8/1950 | Henry | 74/785 |
| 2,648,998 | 8/1953 | Stoeckicht | 74/758 |
| 3,184,994 | 5/1965 | Stahl | 74/758 X |

*Primary Examiner*—Allan D. Herrmann
*Attorney, Agent, or Firm*—Steinberg & Raskin

[57] ABSTRACT

The driving arrangement comprises a planetary gearing transmitting driving torque to the driven output member including a hub journalled in bearings in a support structure and a drum coupled therewith, adapted to take up the load of a moving object. The hub is enclosed within the drum, the hub and the drum being interconnected with aid of discs fixed to their respective end faces, the discs being likewise rigidly coupled with aid of intermediate elements extending between the planet pinions of the planetary gearing, perpendicularly to the plane of rotation thereof. The shafts of the planetary gearing are rigidly coupled with one of the said discs. The driving arrangement incorporates a braking system accommodated outside of the hub.

5 Claims, 5 Drawing Figures

DRIVING ARRANGEMENT

The present invention relates to driving arrangements intended for transmitting driving torque to a driven member, and can be successfully incorporated in the undercarriages and mechanisms of construction and roadbuilding machines, in cars and trucks, in conveyor drives and in other equipment where considerable driving torque is to be transmitted to a driven member in the presence of radial, and more often than not axial loads applied to this driven member. The driven member can be a drum of any structure, e.g. a rope-driving pulley, a wheel, a sprocket gear drum, a spur gear drum, or other similar member.

Known in the art is a great variety of most diverse driving arrangements for transmitting torque to a driven member. In a great number of cases such an arrangement incorporates a planetary gearing receiving rotation from a suitable prime mover, e.g. an electric motor or a hydraulic motor, a brake, a supporting structure, bearings associated with the supporting structure, sealing means, and the driven member which ultimately converts the torque supplied thereto into rotary, translatory or other type of motion. This driven member is usually operatively, e.g. mechanically connected with an element of either a work-performing or another member of the respective machine or mechanism (see, for example, monograph "Transmissions of Construction and Road-Building Machines" by D. P. Volkov, A. F. Krainev, published by MASHINOSTROYENIE Publishers, Moscow, 1973, pp. 100 to 116, Tables 9 and 10).

In one of the groups of the abovementioned driving arrangements the hub and the drum are an integral structure, while the planetary gearing and its element intended solely for transmission of the driving torque to the drum are mounted entirely beyond the supporting structure, axially either to the right or to the left, which results in increased axial dimensions, thus increasing the space requirements for accommodating the driving arrangement.

In yet another group of driving arrangements the hub is likewise made integral with the drum, although the planetary gearing is either partly or completely accommodated within the structure supporting the hub-drum unit. The supporting structure has mounted externally thereof the bearings, the sealing means and the driven member proper. In this construction the internal diameter of the bearings on the supporting structure is greater than the diameter of the built-in sun gear of the planetary gearing, while the external diameter of these bearings is less than the internal diameter of the driven member, i.e. the bearings are accommodated between the built-in planetary gearing element and the driven member per se. Therefore, the size of these bearings determines the radial dimension of the known arrangements of this group, and this dimension in most cases is considerable.

In both abovedescribed groups external axial and radial loads applied to the drum are taken up by the supporting structure directly via the bearings of these supporting structure.

The hitherto known driving arrangements wherein the planetary gearing is either partly or completely built-in externally of the supporting structure have the supporting bearings, as it has been already explained, with an internal diameter positively greater than the internal diameter of the built-in epicyclic or sun gear of the planetary gearing. At the same time, the built-in sun gears in most cases have substantial radial dimensions to provide for the required transmission ratio of the planetary gearing. Therefore, the incorporation of large-diameter built-in sun gears requires the incorporation in such arrangements of bearings with similarly large diameters, alongside of increased dimensions of the sealing means of these bearings and of the planetary gearing, as a whole, which complicates the task of obtaining compact-size driving arrangements. With the radial dimensions of the driving arrangements increasing, their weight accordingly also increases, while the use of large-diameter sealing means affects the reliability of the lubrication of the bearings and of the protection of the bearings and of the planetary gearing against the ingress of ambient media. If the speed of the rotation of the driven member is to be sufficiently high, in order to afford reliable sealing of the supporting bearings and of the planetary gearing, it is necessary to have specifically designed sealing means and a higher machining accuracy of the elements of these sealing means and of the surfaces being sealed. Furthermore, the abovedescribed known structure renders the improvement of the speed and power characteristics of the driven member dependent on a substantial increase of the radial dimension of the arrangement, since it is commonly known that the higher the above characteristics, the greater the required size of the sun gears should be, and, consequently, the greater are the dimensions of the driving arrangements, as a whole.

It is an object of the present invention to provide a driving arrangement featuring relatively small axial and radial dimensions, wherein the driving torque is transmitted to the hub-drum driven member through a planetary gearing.

It is another object of the present invention to provide a driving arrangement wherein the improved lubrication conditions should be afforded, when the driving torque from the planetary gearing is transmitted to the driven member.

It is still another object of the present invention to expand the range of the speed and power characteristics of the driven member of driving arrangements of the herein described type.

It is yet another object of the present invention to optimize the conditions of taking up both radial and axial efforts in a driving arrangement of the herein described type.

These and other objects are attained in a driving arrangement comprising a planetary gearing adapted to transmit a driving torque to a driven member, including a hub journalled on bearings on a supporting structure and a drum coupled with this hub and adapted to take up the load of an object being moved, in which arrangement, in accordance with the invention, the hub is accommodated inside a second series of the planetary gearing within the hub and drum and the drum per se are interconnected with aid of end face discs rigidly secured thereto, the discs, in their turn, being rigidly interconnected with intermediate elements extending between the planet pinions or satellites of a first series of the planetary gearing, perpendicularly to the plane of their rotation, the shafts of the planetary gearing being fast with one of the said end face discs.

Unlike the abovedescribed hitherto known driving arrangements wherein the externally applied radial and axial loads are taken up exclusively by the supporting structure directly through the supporting bearings, in the herein disclosed arrangement these loads are taken up by the supporting structure through the end face discs, the intermediate elements, the hub and the supporting bearings. Furthermore, some of the components of the driven member proper, i.e. the discs, the intermediate elements, take part in the transmission of the driving torque to the drum. The aforementioned distribution of the load and the operative connection with the hub with aid of the discs and of the intermediate elements, on the one hand, enables the reduction of the external diameter of the bearings of the supporting structure, and, on the other hand, makes it possible to decrease the overall radial dimensions, as compared with the hitherto known arrangements.

To facilitate assembling and disassembling of the herein disclosed driving arrangements, it is expedient that the shafts of the planet pinions should be rigidly connected with the end face disc of the hub, and that the end face disc of the drum should have openings formed therethrough in a number equalling that of the planet pinions, for the passage of the last-mentioned pinions therethrough at assembling/disassembling, the axes of these openings being parallel with the axis of this disc.

Two embodiments of the present invention are disclosed. More particularly, the first embodiment illustratd in FIGS. 1–3, comprises a two-speed driving arrangement comprising two series of planetary gearings in which the shafts of the satellites or pinion gears in the first planetary series are rigidly coupled with the face disc of the hub and wherein the intermediate elements comprise solid studs. The second embodiment illustrated in FIGS. 4 and 5 comprises a two-speed driving arrangement utilizing only a single series of planetary gearings and in which the shafts of the satellites are rigidly coupled to the face disc of the drum by means of a carrier, and wherein the intermediate elements comprise hollow studs.

Whatever the embodiment of the present invention, it is both possible and expedient to have the end face discs made integral with the intermediate elements, to provide for higher reliability and strength of the structure of the driving arrangement.

The present invention will be further described in connection with embodiments thereof, with reference being had to the accompanying drawings, wherein.

Figure 4:
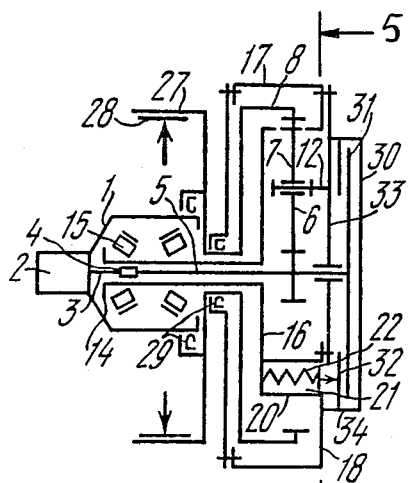
Figure 5:
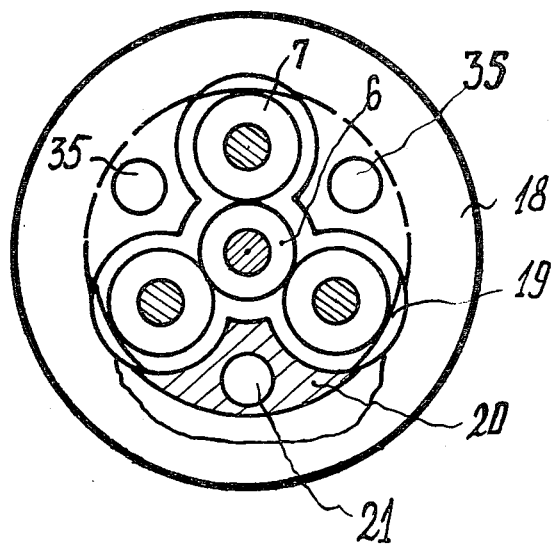

FIG. 4 is a drive diagram of another embodiment of the driving arrangement of the present invention, which additionally features the intermediate elements in the form of hollow studs which receives spring urging means therein; and FIG. 5 is an end view of the driving arrangement illustrated in FIG. 4 with the carrier and the friction disc coupling removed and illustrating the planetary series thereof.

Figure 1:
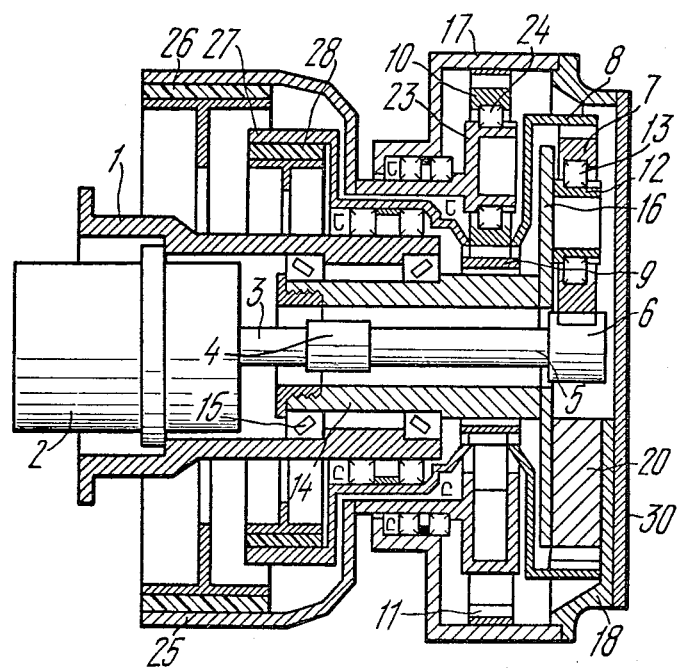
FIG. 1 is a cross-sectional view of one embodiment of a driving arrangement embodying the present invention.
Figure 2:
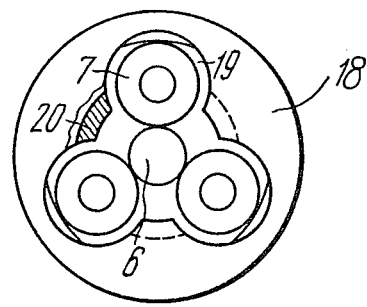
FIG. 2 shows the driving arrangement of FIG. 1, as viewed from the face end, with the end cover removed and illustrating the first planetary series.
Figure 3:
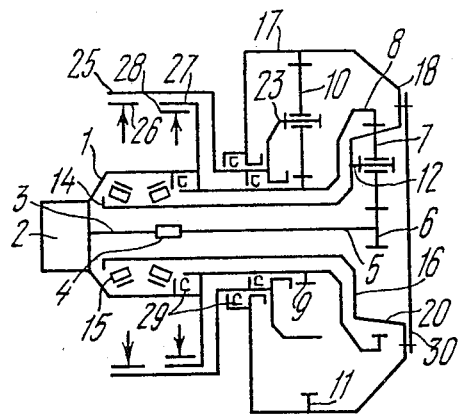
FIG. 3 is a drive diagram of the driving arrangement illustrated in FIG. 1.

As can be seen in FIG. 1, the supporting structure 1 of the illustrated driving arrangement embodying the invention accommodates therein a prime mover 2, e.g. a hydraulic or electric motor, of any suitable known structure. The output shaft 3 of the prime mover 2 is connected via a coupling 4, also of any suitable structure, with a shaft 5 of a predetermined length, which, in its turn, is fast with a sun gear 6. The driving arrangement illustrated in FIG. 1 is a two-speed driving arrangement having its planetary gearing made up of two series of planetary gearings. The first series of the planetary gearing includes the abovementioned driving pinion 6, at least three planet pinions or satellites 7 and a ring gear 8. The second series of the planetary gearing includes a sun gear 9, at least three planet pinions or satellites 10 and a ring gear 11. The number of such series in the driving arrangement depends on the latter's designation and can be one, two, or more. Let us consider once again FIG. 1 which shows that the planet pinions 7 are journalled on their respective shafts 12 on bearings 13 of any suitable known per se structure and retained against axial displacement, and, as it can also be seen in FIG. 1, permanently mesh with the sun gear 6. A hub 14 journalled inside the supporting structure 1 in bearings 15, likewise of any suitable known structure, has rigidly connected to the end face thereof facing the first-mentioned series of the planetary gearing an end face disc 16 of a diameter either equal to or somewhat short of the internal diameter of the ring gear 8. The drum 17 likewise has rigidly connected to its end face facing the first-mentioned series of the planetary gearing an end face disc 18 having made therethrough openings 19 in a number equalling that of the planet pinions 7, to provide for assembling and adjustment of these planet pinions 7, the respective axes of these throughgoing openings 19 being parallel with the axis of the disc 18. These openings 19 can be clearly seen in FIG. 2 of the appended drawings. The end face discs 16 and 18 are rigidly interconnected with massive intermediate elements 20 extending perpendicularly to the plane of rotation of the planet pinions 7, between these pinions 7, as it can be also clearly seen in FIG. 2. The number of these intermediate elements is either equal to or less than the number of the planet pinions 7. The discs 16, 18 and the intermediate elements 20 are to have predetermined dimensions to take up and transmit substantial radial and axial loads and driving torque values. The intermediate elements 20 may be either solid, as it is shown in FIGS. 1, 2 and 3, or else they may have blind internal spaces 21, as it is shown in FIG. 4. In the embodiment illustrated in FIG. 4 these blind spaces 21 accommodate spring-urging means 22 of any suitable known per se structure.

Referring now to FIG. 1, the shafts 12 of the planet pinions 7 are fast with the disc 16 and define therewith the planet pinion carrier of the first series of the planetary gearing of the transmission. It may be expedient to have the hub 14, the disc 16, the intermediate elements 20, the shafts 12, the disc 18 as an integral structure. The planet pinions 7 are meshing with the ring gear 8, and the latter is in the presently described embodiment rigidly connected with the sun gear 9. The latter meshes with at least three planet pinions 10 which are journalled on a carrier 23 on bearings 24 of any suitable known structure and retained against axial displacement. The planet pinions 10 are permanently meshing with the ring gear 11 which is rigidly connected with the drum 17 of the driven member. The carrier 23 is rigidly connected with a brake drum 25 accommodating a brake means 26 of any suitable known type. The sun gear 9 is, in its turn, rigidly connected with a brake drum 27 accommodating a brake means 28, likewise of any suitable known type. The internal space of the planetary gearing and of the bearings 15 of the supporting structure 1 is sealed away from the ambient media with aid of seals 29 of any suitable known structure. From the opposite side, the internal space of the planetary gearing is closed with a cover 30.

Let us consider the operation of the herein disclosed arrangement by referring to FIG. 3 illustrating the drive diagram of the embodiment shown in FIG. 1, where schematically shown like elements are indicated with like numerals.

The First Speed

The brake drum 27 is held stationary through engagement with brake 28 while the brake drum 25 is disengaged from the brake. The sun gear 9 and the ring gear 8 are also held stationary since the drum 27, sun gear 9 and ring gear 8 are all rigidly interconnected.

The driving shaft 3 transmits rotation to the sun gear which imparts rotation to the satellites 7. As the satellites 7 rotate within the braked ring gear 8, they transmit rotation to the disc 16 and, additionally, through the intermediate elements 20, to the disc 18 which imparts rotation to the drum 17 which is rigidly coupled with the end face disc 18. The hub 14 which is rigidly coupled to the end face disc 16 rotates in bearings 15 of the supporting structure 1 which accommodates the radial and axial forces applied to the driving arrangement from the drum 17 through the disc 18, the intermediate elements 20, the disc 16, the hub 14 and the bearings 15. The torque is transmitted from the first series of the planetary gearing, through the disc 16, intermediate elements 20, and the disc 18, to the drum 17.

Since the brake drum 25 is not braked or is unlocked at this time, in conjunction with the carrier 23 which is rigidly coupled to the drum 25, the satellites 10 of the second series of the planetary gearing rotate together with the carrier 23 under no load.

The Second Speed

The brake drum 25 is braked or locked through engagement with brake means 26 and the drum 27 is unlocked. Also locked is the carrier 23 since it is rigidly coupled to the drum 25. The sun gear 9 and the ring gear 8 which are rigidly coupled to each other and to the drum 27 are unbraked and therefore free to rotate.

The driving shaft 3 transmits rotation to the sun gear 6 which imparts rotation to the satellite 7 and the ring gear 8. The ring gear 8 transmits rotation to the sun gear 9 which rotates the satellites 10. Since the satellites 10 have a fixed axis of rotation, they transmit rotation to the ring gear 11 and, additionally, to the drum 17 which is rigidly coupled to the gear 11. Further, rotation is transmitted to the drum 17 from the disc 16 through the intermediate elements 20 and the disc 17 since the satellites 7, which rotate the ring gear 8 and rotate within the latter, cause the disc 16 to rotate.

In this manner, the two rotations of the two series of planetary gearings are summed at the drum 17. The axial and radial forces are transmitted from the drum 17 to the supporting structure 1, as in the case of the first speed condition.

When the brakes 26 and 28 are actuated, rotation of the drum 17 relative to the supporting structure 1 ceases. With the brakes 26 and 28 disengaged or unlocked, the drum 17 rotates freely relative to the supporting structure 1.

The herein disclosed arrangement of the hub 14 and its connection with the drum 17 enable to have the supporting bearings 15 and the seals 19 of smaller dimensions, as compared with the hitherto known driving arrangements, and thus to render the arrangement more compact, less massive and better protected from the ingress of the ambient media. The provision of the through-going openings 19 enables, during an assembling sequence, to unobstructedly engage the planet pinions 7 with the ring gear 8 by displacing either the carrier 33 or the planet pinions 7 axially. The use of smaller supporting bearings and their herein disclosed arrangement further save space that can be utilized for useful purposes.

Referring to FIG. 4, according to the present invention, the relative location of the hub 14 and the drum 17 enables the provision of a compact two-speed driving arrangement wherein only a single series of planetary gearing is required through the use of intermediate elements which house spring-urging means which are built in within these elements and wherein the satellite shafts are rigidly coupled to the end face disc of the drum.

For the sake of clarity, those elements of the embodiment of the driving arrangement illustrated in FIG. 4 which have been retained and perform the same function as corresponding elements illustrated in FIGS. 1–3 are identified by the same reference numerals. More particularly, elements 1, 2, 3, 4, 5, 6, 7, 8, 12, 13, 14, 15, 16, 17, 18, 20, 27, 29 and 30 in FIG. 4 correspond to the identically referenced elements illustrated in FIG. 1 and perform the same functions thereas.

In the driving arrangement illustrated in FIG. 4, the shaft 12 of the satellites 7 are rigidly coupled to the end face disc 18 of the drum 17 by means of carrier 33.

To enable the carrier 33 to axially move together with the satellite 7 during assembly and to allow the satellite 7 to engage the ring gear 8, the disc 18 of the drum 17 is provided with a number of through openings 19 which correspond to the number of satellites 7 as in the case of the driving arrangement illustrated in FIG. 1.

The driving arrangement illustrated in FIG. 4 includes only a single planetary series which, preferably, corresponds to the first planetary series of FIG. 1 and the sun gear 6 is preferably rigidly connected to a driving friction disc 31. As indicated above, carrier 33 is rigidly coupled to the disc 18 and is rigidly connected at its opposite side to a friction clutch housing 34. A friction disc 32, provided with peripheral slots for engaging the slots of the housing 34 is axially moveable to the right or left (as seen in FIG. 4) on inner slots of the housing 34. The surface of the disc 31 which faces the driving disc 32 and which periodically contacts the latter comprises a friction surface which is tempered and ground. The housing 34 is closed by a cover 30 at one side and the interior space of the driving arrangement is sealed at the left side by moveable seals 29 having a relatively small diameter.

Each of the intermediate elements 20 are provided with blind holes 21 which receive spring-urging means 22 of any known type (see FIG. 5). When the spring-urging means operate, for example, a piston rod which is housed within the blind hole 21 moves to the right. In turn, these rods push the disc 32 to the right, pressing it against the friction surface of the disc 31. Due to this friction coupling, rotation is transmitted from the disc 31 to the disc 32 which is capable of axial displacement. The friction disc clutch is actuated in this manner. When the clutch is disconnected, for example, through the movement of the piston rods to the left, the disc 32 is disengaged from its frictional coupling with the disc 31 and rotation thereby ceases to be transmitted from the disc 31 to the disc 32.

Through openings 35 are also provided in the end face disc 18 in order to operatively accommodate the spring-urging means 22 as illustrated in FIGS. 4 and 5.

The operation of the embodiment of the driving arrangement illustrated in FIGS. 4 and 5 is described below.

The First Speed

The drum 27 and gear 8 are engaged by the brake 28 and the disc 32 is maintained out of contact with the disc 31 due to the disengagement of the spring-urging means.

Rotation from the prime mover 2 is transmitted from the shaft 3 through the coupling 4 and the shaft 5 to the pinion 6 and the satellites 7 which rotate within the locked sun gear 8 and rotate the carrier 33 together with the shaft 12 and the disc 18 coupled rigidly to the carrier 33. The disc 18 rotates the drum 17 from which radial and axial forces are transmitted through the disc 18, the intermediate elements 20, the disc 16 and the hub 14, coupled rigidly with the disc 16, to the supporting structure 1 by means of the bearings 15.

The Second Speed

The drum 27 and gear 8 are unlocked, and the spring-urging means 22 are engaged, with the disc 32 pressed against the disc 31. Rotation from the shaft 3 of the prime mover 2 is transmitted through the coupling 4 and the shaft 5 to the sun gear 6 and driving disc 31. Due to frictional engagement between the discs 31 and 32, rotation is transmitted from the disc 31 through the disc 32 to the housing 34 and, further, to the carrier 33 rigidly coupled to the housing 34. The carrier 33 rotates the disc 18 and the drum 17. Radial and axial forces are transmitted from the drum 17 to the supporting structure 1 in a manner similar to the case described above. The satellite 7 and gear 8 rotate under no load.

When both the brake 28 and clutch are engaged, the drum 17 ceases rotation relative to the supporting structure 1 and when both are disengaged the drum 17 runs under no load relative to the supporting structure 1 and the torque is not transmitted from the prime mover 2 to the drum 17.

It is to be understood that the abovedescribed preferred embodiments of the present invention are in no way intended to limit the scope thereof, and that various modifications can be introduced by those competent in the art, without departing from the spirit and scope of the invention, as defined in the claims to follow.

What is claimed is:

1. In a driving arrangement comprising planetary gearing means adapted to transmit driving torque to an output driven member including a hub enclosed with a drum and journalled in a supporting structure on bearing means, said drum being adapted to take up the load of a moving object, an improvement consists in that said hub enclosed within said drum is connected with the latter with aid of end face discs rigidly fixed, respectively, to said hub and to said drum, these discs, in their turn, being interconnected rigidly with aid of intermediate elements extending between the planet pinions of said planetary gearing means perpendicularly to the plane of rotation thereof, the shafts of said planetary gearing means being rigidly connected with one of these discs.

2. A driving arrangement as set forth in claim 1, wherein the shafts of the planet pinions are rigidly connected with the end face disc of the hub, the end face disc of the drum having made therethrough openings in a number equalling that of the planet pinions, to provide for displacement of the latter at assembling, the axes of these openings being parallel with the axis of the respective disc.

3. A driving arrangement as set forth in claim 1, wherein the planet pinion carrier of the planetary gearing is rigidly connected with the end face disc of the drum, this disc having made therethrough openings in a number equalling that of the planet pinions, to provide for displacement of the planet pinions and of the carrier at assembling.

4. A driving arrangement as set forth in claim 1, wherein the driving shaft of this driving arrangement has mounted thereon a driving disc adjacent to the end face disc of the drum, the intermediate elements including hollow studs of which the internal spaces accommodate therein spring-urging means adapted to cooperate with a friction disc, to urge the latter against the driving disc.

5. A driving arrangement as set forth in claim 1, wherein the end face discs and the intermediate elements form an integral structure.

* * * * *